(12) United States Patent
Bassemir et al.

(10) Patent No.: US 9,253,129 B2
(45) Date of Patent: *Feb. 2, 2016

(54) INSTANT MESSAGING WITH BROWSER COLLABORATION

(75) Inventors: Richard Tuthill Bassemir, Austin, TX (US); Ismael Numitor Castillo, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 719 days.

This patent is subject to a terminal disclaimer.

(21) Appl. No.: 13/430,009

(22) Filed: Mar. 26, 2012

(65) Prior Publication Data

US 2012/0240057 A1    Sep. 20, 2012

Related U.S. Application Data

(63) Continuation of application No. 12/899,142, filed on Oct. 6, 2010.

(51) Int. Cl.
*G06F 3/14* (2006.01)
*H04L 12/58* (2006.01)
(Continued)

(52) U.S. Cl.
CPC .............. *H04L 51/046* (2013.01); *H04L 67/02* (2013.01); *G06F 3/1454* (2013.01); *G06F 9/4445* (2013.01); *G06F 9/547* (2013.01)

(58) Field of Classification Search
CPC . G06F 3/0481; G06F 3/04842; G06F 3/1454; G06F 9/4445; G06F 17/30873; H04L 51/046; H04L 12/1813; H04L 12/1827; H04L 51/04; H04L 67/1095; H04L 67/36; H04L 67/38; H04L 12/66; H04L 12/581; G06Q 10/10; G06Q 10/107

USPC ......... 715/738, 740, 744, 752, 753, 758, 759, 715/760, 790; 709/201, 203, 204, 205, 206, 709/207, 217, 278; 370/260, 261
See application file for complete search history.

(56) References Cited

U.S. PATENT DOCUMENTS

| | | | |
|---|---|---|---|
| 5,764,902 A | 6/1998 | Rothrock | |
| 6,556,724 B1 * | 4/2003 | Chang et al. | 382/299 |

(Continued)

OTHER PUBLICATIONS

"Rendering a web page—step by step" (posted on Jan. 11, 2010) https://friendlybit.com/css/rendering-a-web-page-step-by-step/.*

(Continued)

*Primary Examiner* — Alvin Tan
*Assistant Examiner* — Rinna Yi
(74) *Attorney, Agent, or Firm* — Kunzler Law Group; Steven Bennett

(57) ABSTRACT

The invention enables collaboration between first and second users at first and second workstations having first and second browsers, respectively. A page is loaded into the first browser. An instant messaging connection is established between the first workstation and the second workstation. Then an address of the page loaded at the first browser is sent to the second browser via the instant messaging connection. At the second browser the page is loaded in response to receipt of the page address. A network connection is then established between the first browser and the second browser. Thereafter, messages are sent from the first browser to the second browser via the network connection responsive to screen events by a user at the first workstation to control screen events at the second workstation.

5 Claims, 7 Drawing Sheets

(51) Int. Cl.
*H04L 29/08* (2006.01)
*G06F 9/54* (2006.01)
*G06F 9/44* (2006.01)

(56) References Cited

U.S. PATENT DOCUMENTS

| | | |
|---|---|---|
| 6,954,902 B2 | 10/2005 | Noma et al. |
| 7,353,254 B2 | 4/2008 | Kusuda |
| 7,610,352 B2 | 10/2009 | AlHusseini et al. |
| 7,908,554 B1 | 3/2011 | Blattner |
| 2003/0225836 A1* | 12/2003 | Lee et al. .................. 709/205 |
| 2005/0097159 A1* | 5/2005 | Skidgel .................. 709/200 |
| 2005/0181348 A1 | 8/2005 | Carey et al. |
| 2006/0053194 A1* | 3/2006 | Schneider et al. .......... 709/204 |
| 2008/0059592 A1 | 3/2008 | Marsh et al. |
| 2008/0184128 A1* | 7/2008 | Swenson et al. ............ 715/738 |
| 2008/0304518 A1 | 12/2008 | Cheng et al. |
| 2008/0304698 A1 | 12/2008 | Rasmussen et al. |
| 2009/0128567 A1 | 5/2009 | Shuster et al. |
| 2009/0217177 A1 | 8/2009 | DeGrazia |
| 2009/0254840 A1 | 10/2009 | Churchill et al. |
| 2009/0265622 A1 | 10/2009 | Hickman |
| 2009/0276455 A1 | 11/2009 | Yu et al. |
| 2010/0070899 A1 | 3/2010 | Hunt et al. |

OTHER PUBLICATIONS

Kim, et al.; "Design and Implementation of Mobile Cobrowsing Service Which Supports the Sharing of Webpage Among Mobile Users", ICHIT Conf. on Aug. 28-30, 2008, pp. 266-269.
Denoue, et al.; "WebNC: Efficient Sharing of Web Applications", Madrid, Spain, Apr. 20-24, 2009.
U.S. Appl. No. 12/899,142, Final Office Action, May 9, 2013.
U.S. Appl. No. 12/899,142, Office Action, Mar. 27, 2014.
U.S. Appl. No. 12/899,142, Office Action, Jun. 11, 2012.
U.S. Appl. No. 12/899,142, Office Action, Oct. 2, 2012.
U.S. Appl. No. 12/899,142, Final Office Action, Mailed: Sep. 19, 2014.
U.S. Appl. No. 12/899,142 Office Action, May 29, 2015.
"Rendering a web page—step by step" (posted on Jan. 11, 2010) http://friendlybit.com/css/rendering-a-web-page-step-by-step/.

* cited by examiner

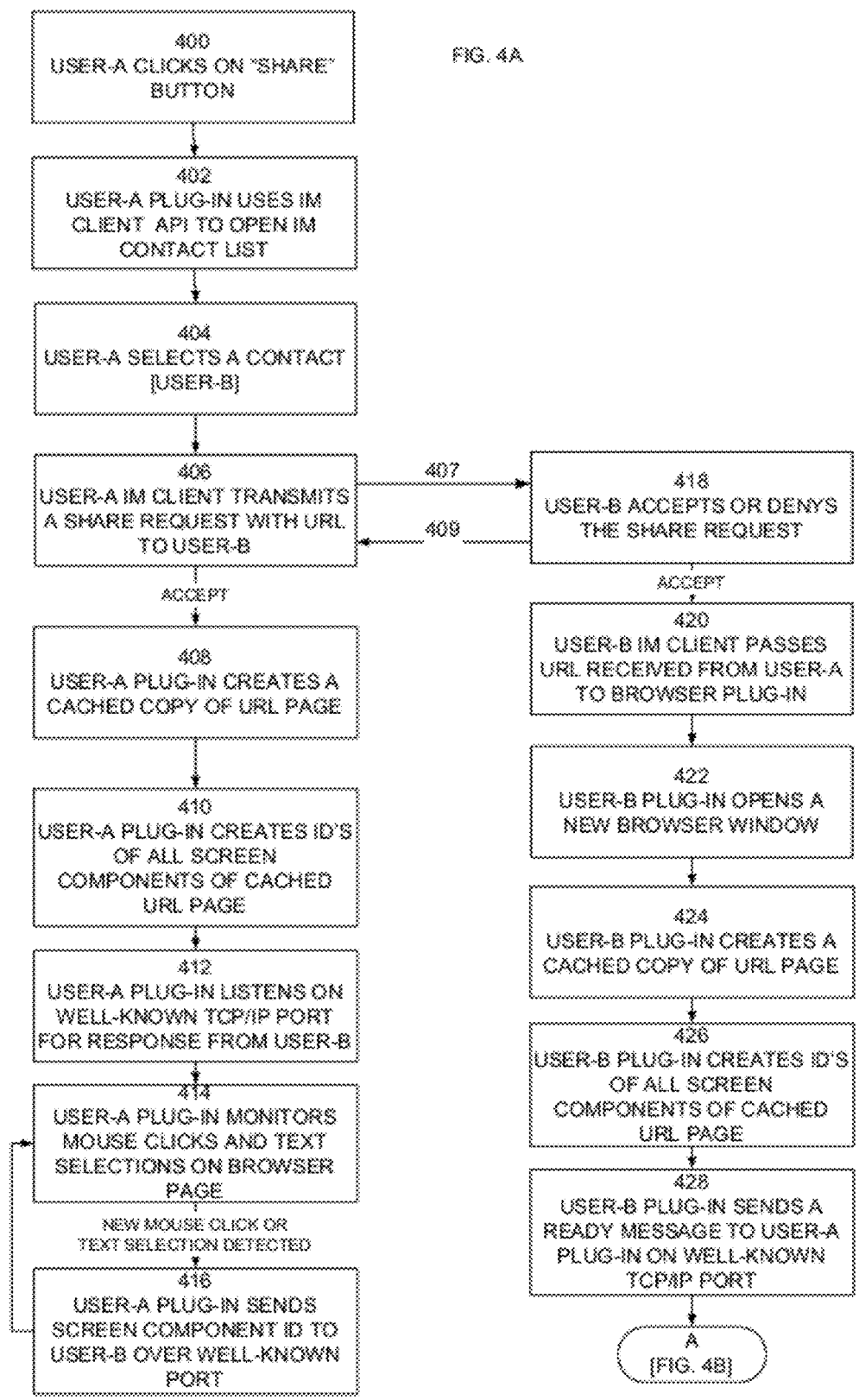

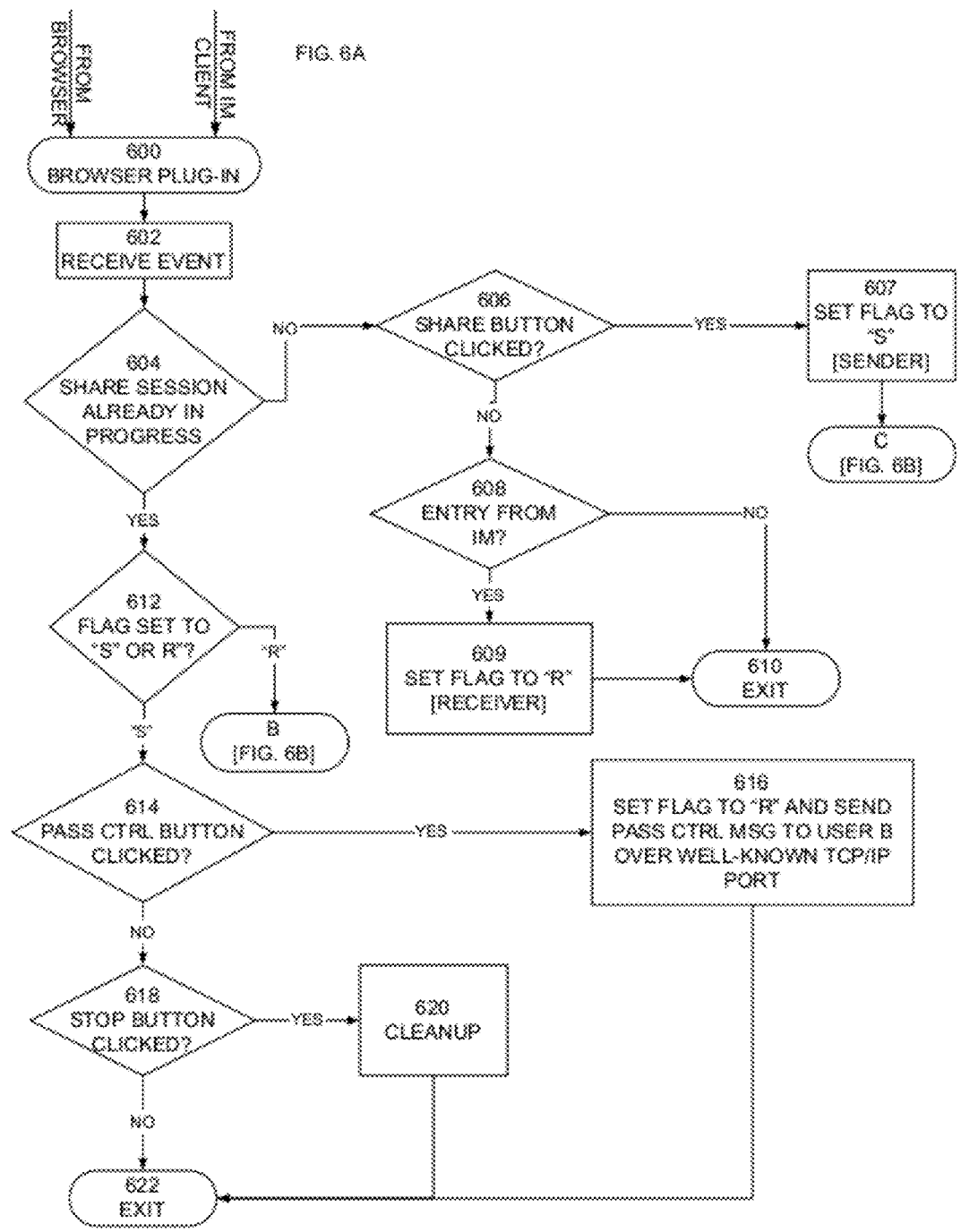

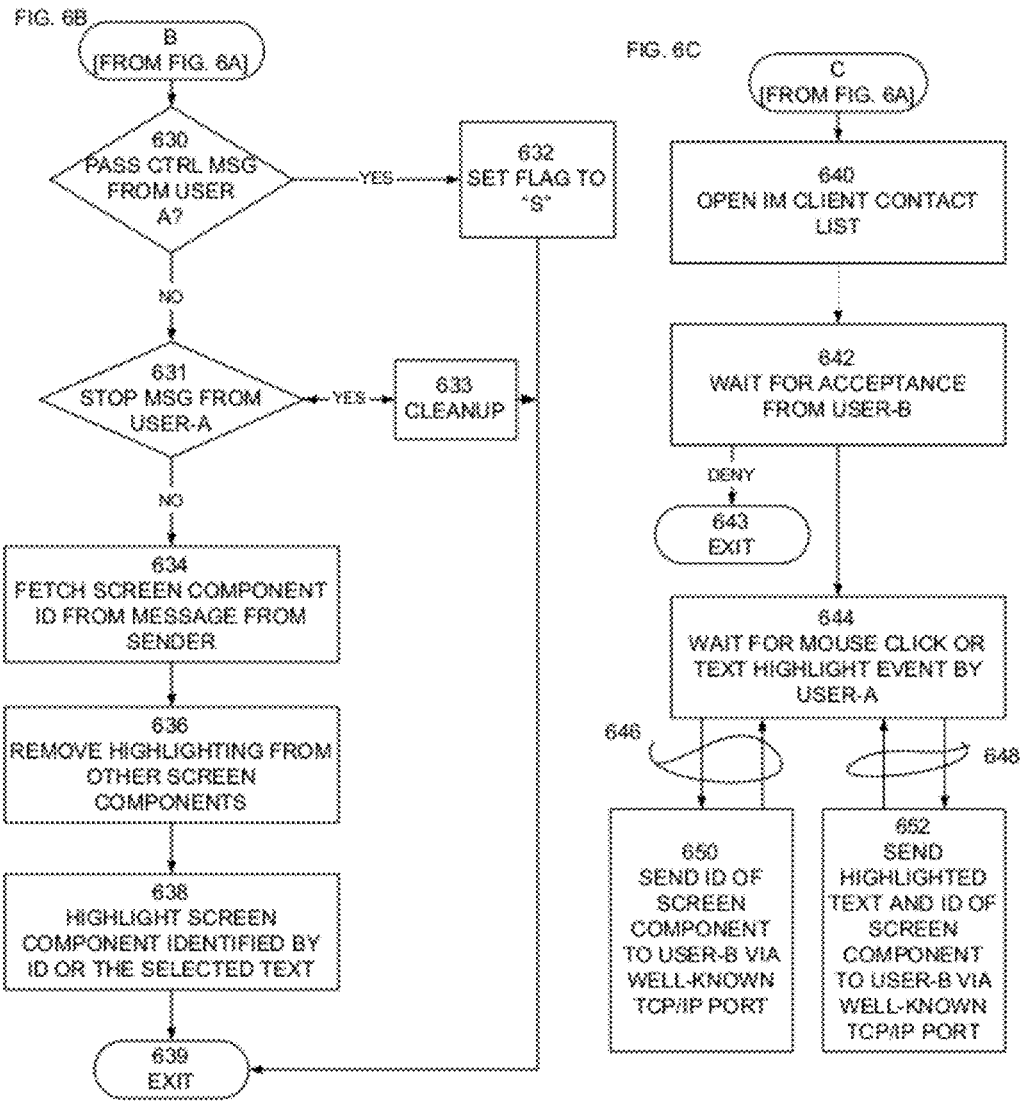

INSTANT MESSAGING WITH BROWSER COLLABORATION

CROSS-REFERENCE TO RELATED APPLICATIONS

This application is a continuation of commonly assigned U.S. patent application Ser. No. 12/899,142, filed on Oct. 6, 2010 which is hereby incorporated herein by reference.

TECHNICAL FIELD

The invention relates to the field of networking in general, and specifically to enhancing collaboration between users of browsers by controlling a browser at a second location in accordance with browser screen events at a first location.

BACKGROUND OF THE INVENTION

When in the middle of a browsing session by a first user and the first user wishes to share certain screen content of a displayed page with a second user, typically the first user will start an instant messaging connection with the second user and paste an address of the page in the IM client. The second user then must open a browser if not already open and navigate to the page. The second user must then determine where to focus in the displayed page by communicating with the first user using the IM chat session. This is difficult and confusing and can be quite frustrating.

There are other known solutions to this problem, such as Webcasts, Netmeetings and Follow-me techniques. Each of these techniques have drawbacks. In the case of Webcasts and Netmeetings, screen sharing is poor in terms of response time, color performance is poor and connection performance degrades as users are added. In Follow-me techniques there is no continuous peer-to-peer data exchanges and every user uses his or her own network connection. Nevertheless, only page addresses are shared and there is no way to determine where on a page each user is focusing. This is especially frustrating on large pages.

SUMMARY OF THE INVENTION

In accordance with the disclosed embodiment, the invention is a method for enabling collaboration between first and second users at first and second workstations, wherein the first and second workstations have first and second browsers and first and second display screens, respectively. A page is loaded into the first browser. An instant messaging connection is established between the first workstation and the second workstation. Then an address of the page loaded at the first browser is sent to the second browser at the second workstation via the instant messaging connection. At the second browser the page is loaded in response to receipt of the page address. A network connection is then established between the first browser and the second browser using a network address known to both browsers. Thereafter messages are sent from the first browser to the second browser via the network connection responsive to screen events by a user at the first workstation to control screen events at the second workstation.

The above as well as additional objects, features, and advantages of the present invention will become apparent in the following detailed written description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A and 4B show functional operations that occur between different browsers in establishing collaboration between the browsers in the disclosed and illustrative embodiment;

FIGS. 6A, 6B and 6C show a flowchart of steps that are performed by the browser plug-in at both a sending browser and a receiving browser in a collaboration session.

DETAILED DESCRIPTION

Figure 1:
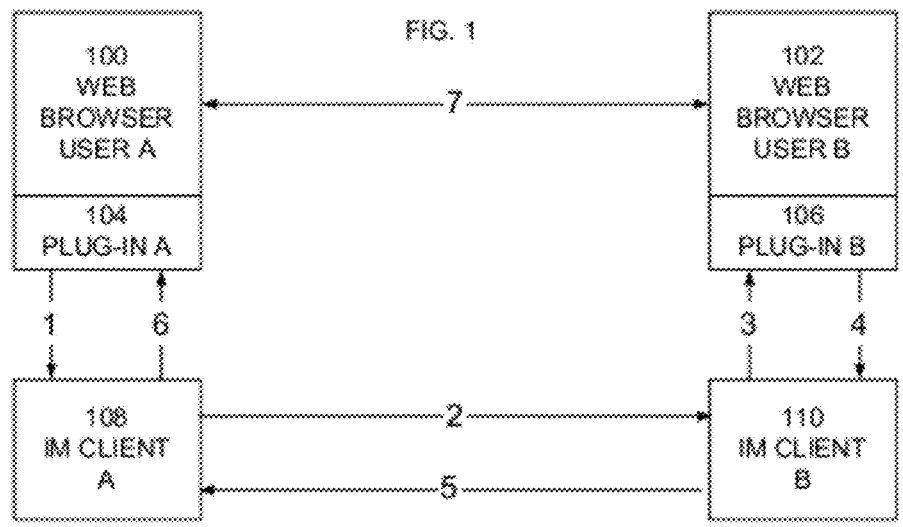
FIG. 1 shows a simplified diagram of a network, including browsers and instant messaging clients, suitable for practicing the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The words "collaborate" and "share" and their respective derivatives are used interchangeably in this specification depending on context.

Figure 2:
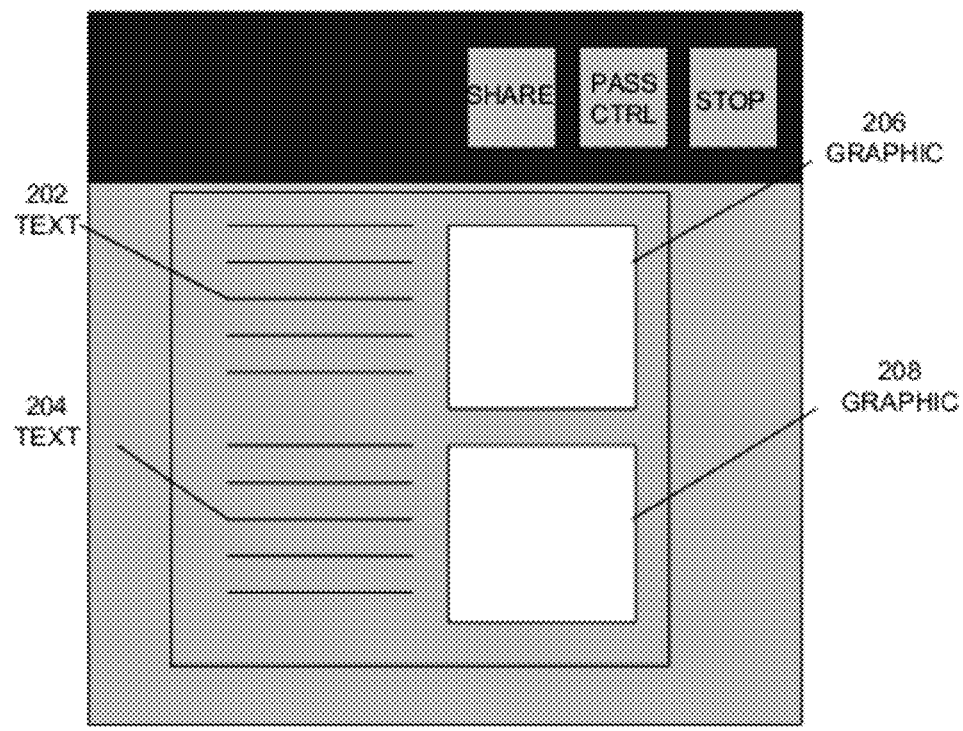
FIG. 2 shows a view of an illustrative browser screen display, including buttons that are used to control a collaboration session between users.

With reference now to the figures and in particular with reference to FIG. 1, there is depicted a general view of two users (User-A and User-B) at different browsers 100 and 102 on different workstations. Each browser is equipped with a browser plug-in 104 and 106. Preferably, the plug-ins 104 and 106 are identical. Also shown are instant messaging clients 108 and 110 at browsers 100 and 102, respectively. The arrows connecting the components of FIG. 1 are numbered to show the sequence of operations in initiating a collaboration session between the browsers. Initially, a sender (User-A) at browser 100 initiates a collaboration request by clicking on a SHARE button displayed on a browser header as shown in FIG. 2. This results in a request message at 1 from plug-in 104 to IM client 108 that sends an instant message 2 to IM client 110 (User-B) and to plug-in B at message 3. If User-B accepts the request at message 4, the accept message is returned at 5 to IM client 108 and on to plug-in A at message 6. The User A plug-in 104 then instructs browser 100 to open a TCP/IP connection on a predefined, well known port. At the same time, responsive to the acceptance of the request, the User-B plug-in 106 instructs the User-B browser 102 to open a new browser window and load a page at an address contained in the original request message from User-A. The User-B browser 102 also begins to listen on the predefined, well known TCP/IP port. At this point, a collaboration session 7 is established between the browsers using pre-defined, well-known TCP/IP ports at both browsers.

FIG. 2 is an illustrative browser page that is used to illustrate the invention. As shown, the browser page contains collaboration buttons SHARE, PASS CONTROL and STOP in the browser header. Within the page itself, two illustrative text screen components 202 and 204 are shown. Also shown are two illustrative graphic components 206 and 208. Unique identifiers will be assigned to these screen components, as will be described further below.

Figure 3:
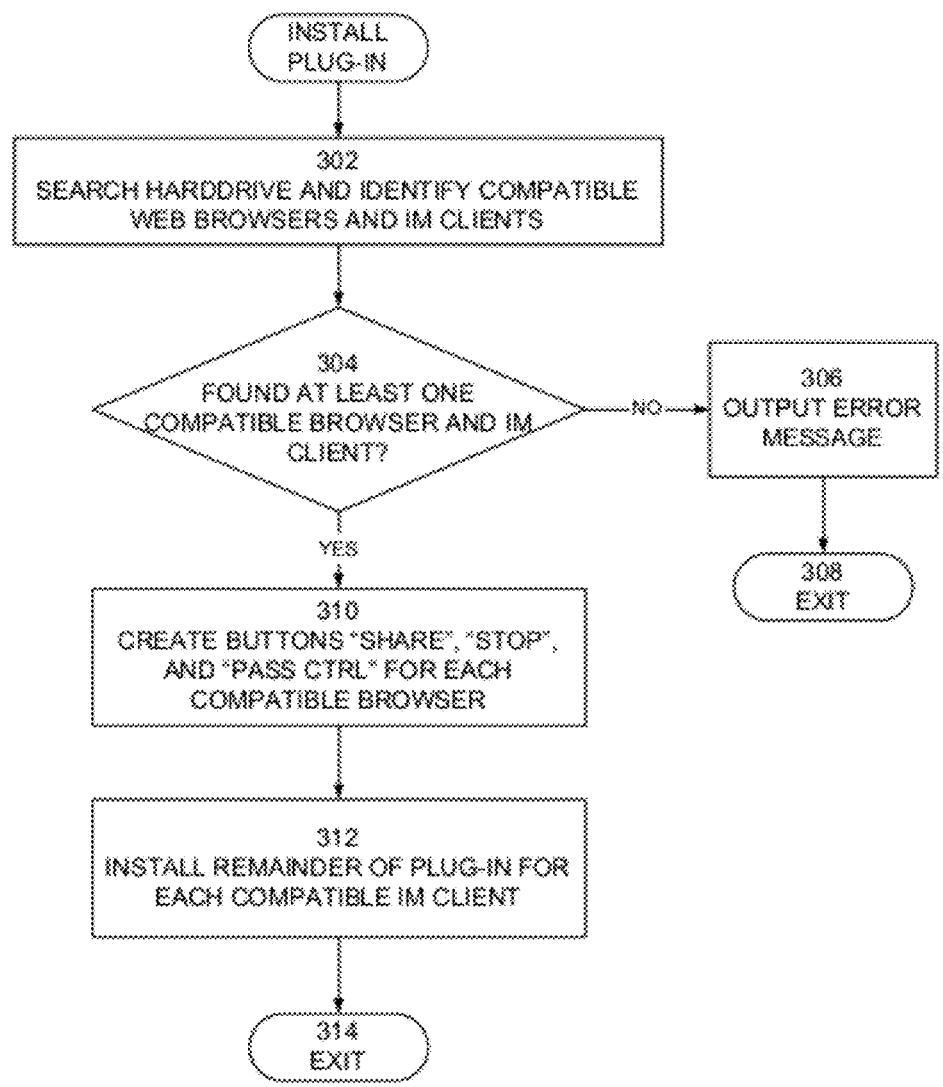
FIG. 3 is a flowchart of steps used to install a browser plug-in that controls a collaboration session between users.

FIG. 3 shows relevant steps that are performed to install plug-ins 104 and 106 at browsers 100 and 102. At step 302, any storage media at the computers that house the browsers 100 and 102 are searched for instant messaging clients that are compatible with the plug-ins to be installed. If no compatible IM client is found at 304 an error message is outputted to a user at 306 and the install is terminated at 308. Assuming that a compatible IM client is found at 304, the buttons SHARE, STOP AND PASS CONTROL are created in the browser header at step 310. The remainder of the plug-in code is installed at 312 and this process is repeated for each compatible IM client that is found at the computer. After step 312 is complete, the process exits 314.

Figure 4B:
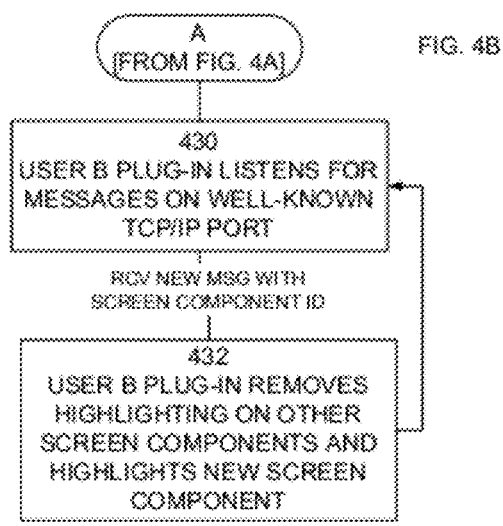
Figure 5A:
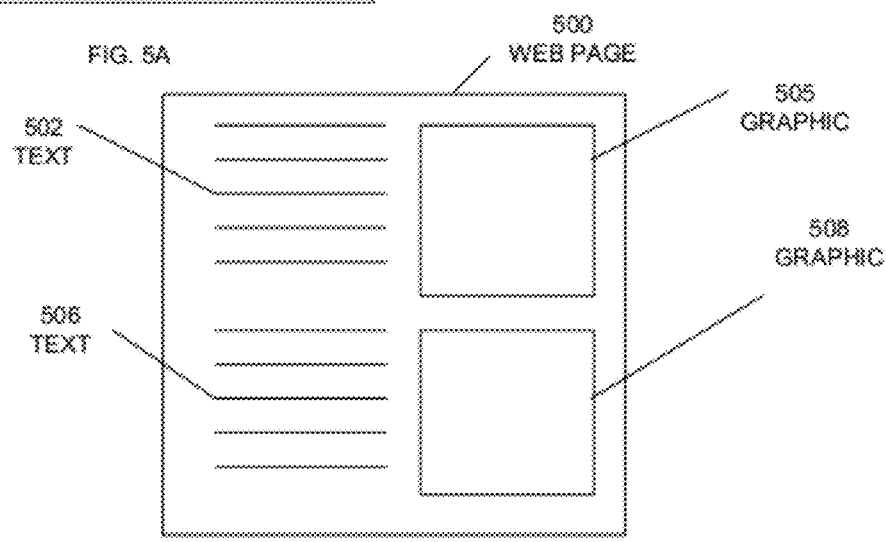
FIG. 5A shows one exemplary browser display page at a first browser and FIG. 5B shows a cached copy of the page after each screen component of the page has been assigned a different identification number.
Figure 5B:
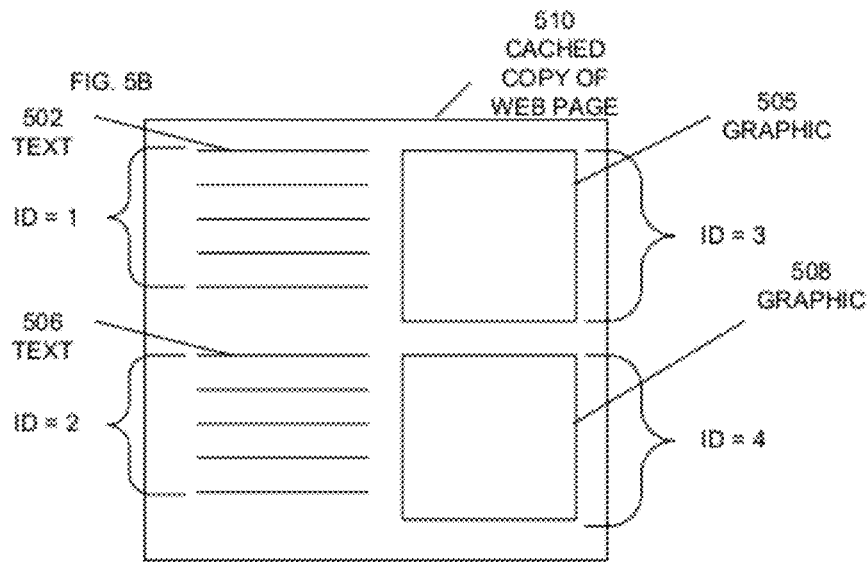

FIGS. 4A and 4B show an overall functional view of the operations that are performed in establishing a collaboration session between User-A and User-B. It is assumed that User-A initiates the session request by clicking the SHARE button at 400. At 402, the User-A plug-in uses an application program interface (API) to open an IM contact list for User-A. At 404, User-A selects a contact with whom he or she wishes to collaborate. This will be called User-B. At 406, 407 and 418, the User-A IM client 108 transmits a share request to User-B. This request contains an address of the page that is presently displayed on the browser screen of User-A. if User-B denies the request at 409, everything stops, of course. But, assuming that User-B accepts the request, User-A's plug-in at 408 caches the source code of the User-A screen page that is displayed and at 410 the plug-in parses the cached source code to locate all screen components of the page, which in the case of FIG. 2 would include the text components 202 and 204 and the graphic components 206 and 208. To each of these screen components, User-A's plug-in assigns a different identifier. With reference to FIGS. 5A and 5B, 5A summarizes the page 500 shown on User-A's browser and 5B shows the different identifiers that might be assigned by the User-A plug-in to the text and graphic components in the cached copy 510 of the page. For, example, the text component 502 is assigned ID 1, while graphic component 508 is assigned ID 4. Text 506 is assigned ID 2 and graphic 505 is assigned ID 3.

Returning to FIG. 4A and step 412, at this point the User-A plug-in begins to listen on a predefined, well-known TCP/IP port for responses from User-B. This establishes one end of the TCP/IP session 7 in FIG. 1. The User-A plug-in also begins to monitor at 414 the User-A browser for mouse clicks or text selections by User-A.

At the same time that the User-A IM client and browser plug-in are setting up the User-A end of the TCP/IP session 7, the IM client and plug-in at User-B's site is also performing steps to establish the User-B end of the TCP/IP session 7. Specifically, at 420 after the User-B IM client has sent an accept message to User-A, the User-B IM client passes the page address, which might be a Universal Resource Locator (URL) received in the collaboration request message from User-A to the User-B browser plug-in. As a result, the User-B browser opens a new browser window at 422 and loads the page using the page address. After the page is loaded, step 424 also stores a cached copy of the source code of the page and step 426 performs steps to assign different identifiers to the screen components of the page. Because the plug-ins perform the same operations in the same order, the assigned ID's are the same for the screen components as they are at User-A's cached copy of the page. At step 428, the User-B plug-in sends a ready message to User-A using the predefined well-known TCP/IP port. Continuing on at entry A of FIG. 4B, the User-B plug-in at 430 then begins to listen on the well-known TCP/IP port for messages from User-A. This completes the establishment of the TCP/IP session 7 of FIG. 1.

With reference now to step 414 of FIG. 4, assume that after receiving the ready message from User-B, step 414 detects a mouse click or a text selection by User-A. In this event, step 416 sends a TCP/IP message to User-B's browser containing the assigned ID of the screen component, and if the event is a text selection, then a copy of the selected text is sent in the message as well. Step 416 then returns to step 414 to watch for more screen events by User-A.

The TCP/IP message containing the ID and possibly selected text is received by the User-B browser and plug-in 106 at step 432 of FIG. 4B. As a result, the User-B plug-in at step 432 removes all highlighting of screen components that might be present and uses the received ID and possibly any selected text to highlight the same screen component or selected text as is the case on User-A's screen. Step 432 at browser B 102 then returns to step 430 to listen for more messages from User-A.

While the displayed screens at both User-A and User-B are kept up-to-date in terms of highlighting, the IM chat connection is still in place such that User-A and User-B can exchange instant messages with regard to the highlighted components.

FIGS. 6A through 6C show in more detail the illustrative steps that might be performed by the browser plug-in at User-A and User-B. A browser plug-in begins operation at 600. There are two ways to enter 600, There is a entry from a browser, shown on the left of 600 and an entry from an IM client, shown on the right of 600. In either case, step 602 receives the event and whatever data occasions the entry.

The Initial Collaboration Request by User-A

At step 602, it is determined if a collaboration session is already in progress. If we assume that this is an initial collaboration request at the User-A browser occasioned by User-A clicking the SHARE button, then the User-A plug-in receives the request on the browser entry to 600. A share session is not in progress, so that step 604 proceeds to step 606 where it is determined that a SHARE button has been clicked by the user at this location (assumed to be User-A). Therefore, step 607 sets a flag to "S" to mark this site as a sender. Step 607 proceeds to entry C in FIG. 6C where step 640 opens a User-A IM client contact list. The steps already described in selecting a buddy and sending a IM collaboration request to the buddy are then performed, but shown only as a dashed line leading from step 640 to 642. Step 640 waits for an accept or deny response from the buddy (User-B). If User-B denies the request, operations terminate at 643. However, assuming User-B accepts the request, step 644 begins to listen for a screen event by User-A as already described.

Response at Browser-B to the Initial Share Request

User-B receives the initial request from User-A as an entry to 600 of the User-B browser plug-in from the User-B IM client. There is no share session in progress at User-B and the User-B SHARE button has not been clicked. Therefore, steps 604, and 606 at the User-B plug-in 106 wind up at step 608. For this to be a valid entry into the User-B plug-in it must be an initial collaboration request received at the IM entry to 600. Step 608 verifies that this entry into 600 is from an IM client. If not, this is an erroneous entry and is ignored. For a valid entry, step 609 sets the plug-in flag to "R" to flag this browser plug-in as a receiver plug-in. The User-B plug-in is then exited at 610 to wait for another entry into this User-B plug-in.

Browser-A Plug-In Operations after the Initial Collaboration Request

From now on until the collaboration session is terminated, all mouse clicks and text selections at a sending site (User-A at this point) are sent to the receiving site (User-B at this point) by steps 644, 650 and 652 of FIG. 6C. At the same time, clicks on the SHARE, PASS CONTROL and STOP buttons at the sending site are handled at FIG. 6A, as will be described.

At User-A, when a mouse click occurs on a screen component, paths 646 of FIG. 6C are used to send the ID of the screen component to step 650 and return to step 644. Step 650 sends the ID to User-B via the well-known TCP/IP port, as already described. If a text selection by User-A is detected, paths at 648 are used to send both the component ID and the selected text to 652 where this data is sent to User-B over the well-known TCP/IP port and then to return to step 644.

At some point in a collaboration session, User-A might wish to pass control of the session to User-B as the sender, and to place User-A in receiver status. To do this, User-A clicks on the PASS CONTROL button in the User-A browser header. Also at some point, User-A will wish to terminate the collaboration session. User-A clicks the STOP button in the header to accomplish this. Either of these operations causes an entry to browser-A 600 in FIG. 6A. Since a share session is in progress and the User-A browser flag is set to "S", execution proceeds to step 614 where it is determined if the PASS CONTROL button was clicked. If the answer is yes, step 616 sets the User-A browser flag to "R" to switch the browser-A status and then sends a pass control message to browser-B via the TCP/IP connection.

If the STOP button was clicked, step 618 makes this determination and then step 620 performs obvious cleanup operations, including sending a STOP message to User-B to terminate the collaboration session and then exits at 622.

Browser-B Plug-in Operations after the Initial Collaboration Request

Control messages (PASS CONTOL, STOP) sent from the User-A plug-in at steps 616 and 620 or screen messages (mouse clicks on screen components or text selection) sent at steps 650 and 652 are received at the User-B plug-in as browser entries to 600 of the browser-B plug-in. Because a TCP/IP session has already been established between the browsers, step 604 at the browser-B plug-in will proceed to step 612 whenever a control message or a message depicting a User-A mouse click or a text selection is received at User-B. Step 612 determines if this browser is a sender or receiver. In the present example, the User-B browser is the receiver and step 612 proceeds to entry B in FIG. 6B. Step 630 of FIG. 6B determines if the incoming message is a PASS CONTROL from User-A. If so, step 632 sets the browser-B flag to "S" and exits. At this point both browsers have changed states such that browser-B is the sender and browser-A is the receiver. User-B can now control the share session.

If the incoming message at browser-B is a STOP message as determined at step 631, step 633 performs obvious cleanup operations at step 633 to terminate the session, including stopping the listening on the well-known TCP/IP port.

If the incoming message is neither a PASS CONTROL nor a STOP message, it must be a User-A mouse click or text selection message. Step 634 fetches the screen component identifier from the message. Step 636 removes all highlighting from the User-B screen in case some component is highlighted and step 638 highlights the identified screen component or the selected text if that is the case and then exits at 639.

Figure 7:
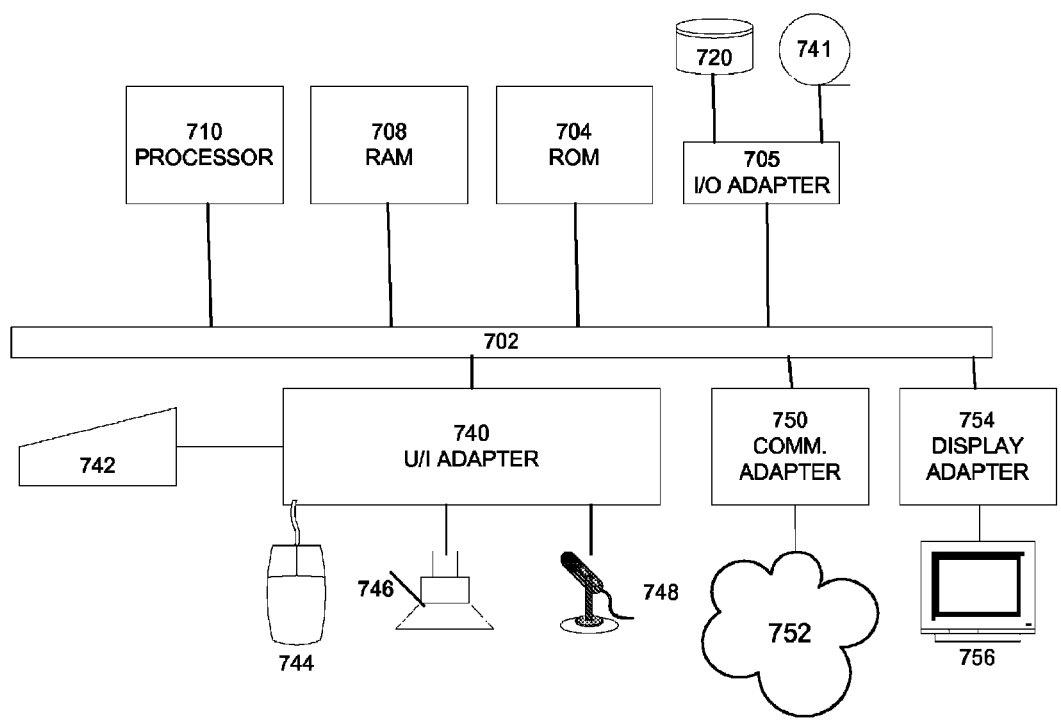
FIG. 7 shows an architecture of an illustrative computer that might be used to perform the invention.

FIG. 7 illustrates a simplified example of an information handling system that may be used to practice the present invention. The invention may be implemented on a variety of hardware platforms, including embedded systems, personal computers, workstations, servers, and mainframes. The computer system of FIG. 7 has at least one processor 710. Processor 710 is interconnected via system bus 702 to random access memory (RAM) 708, read only memory (ROM) 704, and input/output (I/O) adapter 705 for connecting peripheral devices such as disk unit 720 and tape drive 741 to bus 702. The system has a user interface adapter 740 for connecting keyboard 742, mouse 744, or other user interface devices such as audio output device 746 and audio input device 748 to bus 702. The system might have a communication adapter 750 for connecting the information handling system to a data processing network 752, and display adapter 754 for connecting bus 702 to a display device 756. Communication adapter 750 might link the system depicted in FIG. 7 with hundreds or even thousands of similar systems, or other devices, such as remote printers, remote servers, or remote storage units. The system depicted in FIG. 7 may be linked to both local area networks (sometimes referred to as intranets) and wide area networks, such as the Internet.

It should be clear that there are many ways that skilled artisans might use to accomplish the essential steps to police an overall network solution, other that the specific steps and data structures described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

We claim:

1. A method of collaborating between first and second users at first and second workstations, the first and second workstations having first and second web browsers and first and second display screens, respectively, comprising:
   loading a web page into the first web browser;
   establishing an instant messaging connection between the first workstation and the second workstation;
   sending an address of the web page loaded at the first web browser to the second web browser at the second workstation via the instant messaging connection;
   loading the web page at the second web browser in response to receipt of the web page address;
   establishing a network connection between a TCP/IP protocol between the first web browser and the second web browser; and
   transmitting messages from the first web browser to the second web browser via the TCP/IP protocol network connection responsive to screen events by a user at the first web browser to control screen events at the second web browser;
   caching source language of the web page displayed at the first and second web browsers;
   parsing, separately at the first web browser and the second web browser, the source language of the cached source language of the web page displayed at the first web browser and the second web browser to identify one or more screen components defined by the source language;
   assigning a unique identifier to each screen component of the one or more screen components, the unique identifiers being used to synchronize the screen events at the first and second web browsers, wherein the screen components for the web page displayed at the second web browser are assigned the same unique identifiers as the unique identifiers assigned to the screen components for the web page displayed at the first web browser; and
   detecting a text selection in the web page at the first web browser, wherein a message is sent to the second web browser comprising a copy of the text selected in the web page at the first web browser, wherein text in the web page at the second web browser that corresponds to the copy of the text selected in the web page at the first web browser is highlighted in the second web browser.

2. The method of claim 1 further comprising:
- using a plug-in at the first web browser to monitor screen events at the first web browser.

3. The method of claim 1 further comprising:
- monitoring screen events at the first web browser;
- in response to a screen event on a screen component by a user at the first web browser, sending a message to the second web browser via the TCP/IP protocol network connection to perform the same event on the same screen component at the second web browser.

4. The method of claim 3 wherein monitoring the screen events at the first web browser further comprises detecting a selection operation of a screen component by a user at the first web browser.

5. The method of claim 1 wherein the method further comprises:
- sending a message from the first web browser to the second web browser via the TCP/IP protocol network connection to swap roles between the first and second web browsers.

* * * * *